(12) United States Patent
Stroes et al.

(10) Patent No.: US 7,860,453 B2
(45) Date of Patent: *Dec. 28, 2010

(54) METHOD AND APPARATUS FOR RECEIVING DUAL BAND SIGNALS FROM AN ORBITAL LOCATION USING AN OUTDOOR UNIT WITH A SUBREFLECTOR AND ADDITIONAL ANTENNA FEED

(75) Inventors: Gustave Stroes, Beverly Hills, CA (US); Patrick J. Loner, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1014 days.

This patent is subject to a terminal disclaimer.

(21) Appl. No.: 11/602,821

(22) Filed: Nov. 21, 2006

(65) Prior Publication Data

US 2008/0120653 A1 May 22, 2008

(51) Int. Cl.
H04B 7/185 (2006.01)
H04B 7/19 (2006.01)
H04W 4/00 (2009.01)

(52) U.S. Cl. ............... 455/12.1; 455/13.2; 455/427

(58) Field of Classification Search ......... 455/3.01, 455/3.06, 12.1, 13.1, 427; 725/70, 68; 343/840, 343/834
See application file for complete search history.

(56) References Cited

U.S. PATENT DOCUMENTS

| | | | | |
|---|---|---|---|---|
| 5,797,082 A * | 8/1998 | Lusignan | ............... | 725/70 |
| 5,812,096 A * | 9/1998 | Tilford | ............... | 343/781 R |
| 5,930,680 A * | 7/1999 | Lusignan | ............... | 455/12.1 |
| 6,032,041 A * | 2/2000 | Wainfan et al. | ............... | 455/427 |
| 6,087,999 A * | 7/2000 | Muhlhauser et al. | ............... | 343/753 |
| 6,125,261 A * | 9/2000 | Anselmo et al. | ............... | 455/12.1 |
| 6,272,317 B1 * | 8/2001 | Houston et al. | ............... | 455/13.1 |
| 6,324,381 B1 * | 11/2001 | Anselmo et al. | ............... | 455/12.1 |
| 6,336,030 B2 * | 1/2002 | Houston et al. | ............... | 455/13.2 |
| 6,339,707 B1 * | 1/2002 | Wainfan et al. | ............... | 455/427 |
| 6,441,797 B1 * | 8/2002 | Shah | ............... | 343/840 |
| 6,445,359 B1 * | 9/2002 | Ho | ............... | 343/840 |
| 6,492,954 B2 * | 12/2002 | Gau et al. | ............... | 343/776 |
| 6,504,514 B1 | 1/2003 | Toland et al. | | |
| 6,512,485 B2 * | 1/2003 | Luly et al. | ............... | 343/781 CA |
| 6,577,283 B2 | 6/2003 | Wu et al. | | |

(Continued)

OTHER PUBLICATIONS

Non-final Office Action dated Jun. 13, 2008 in U.S. Appl. No. 11/602,822, filed Nov. 21, 2006 by Gustave Stroes et al.

(Continued)

Primary Examiner—Tilahun Gesesse

(57) ABSTRACT

A satellite system 10 having a first satellite 14 at a first orbital slot B has a first transponder 32 and a second generating a first downlink signal 44B at a first frequency and a second downlink signal 44C at a second frequency. An outdoor unit is directed toward the first satellite 14 and includes a support structure, a reflector 64 coupled to the support structure and reflecting the first downlink signal and the second downlink signal. A first feed 66B is coupled to the support structure and receives the first downlink signal. A second feed 70A is coupled to the support structure and receives the second downlink signal. A secondary reflector 72 reflects the second downlink signal to the second feed 70.

38 Claims, 6 Drawing Sheets

U.S. PATENT DOCUMENTS

| | | | | |
|---|---|---|---|---|
| 6,633,744 | B1 * | 10/2003 | Howell | 455/12.1 |
| 6,694,137 | B2 * | 2/2004 | Sharon | 455/427 |
| 6,708,029 | B2 * | 3/2004 | Wesel | 455/428 |
| 6,747,608 | B2 * | 6/2004 | Wu | 343/909 |
| 6,947,702 | B2 | 9/2005 | Green, Sr. | 455/3.02 |
| 7,020,462 | B1 * | 3/2006 | Wesel | 455/427 |
| 7,046,959 | B2 * | 5/2006 | Ammar et al. | 455/13.1 |
| 7,493,078 | B2 * | 2/2009 | Perlman | 455/3.01 |
| 2001/0000123 | A1 | 4/2001 | Benjauthrit | |
| 2002/0008669 | A1 * | 1/2002 | Muhlhauser et al. | 343/840 |
| 2002/0140617 | A1 * | 10/2002 | Luly et al. | 343/781 CA |
| 2004/0110468 | A1 * | 6/2004 | Perlman | 455/13.3 |

OTHER PUBLICATIONS

Notice of Allowance dated Aug. 13, 2009 in U.S. Appl. No. 11/602,823, filed Nov. 21, 2006 by Gustave R. Stroes et al.
Notice of Allowance dated Oct. 7, 2008 in U.S. Appl. No. 11/602,822, filed Nov. 12, 2006 by Gustave Stroes et al.

* cited by examiner

METHOD AND APPARATUS FOR RECEIVING DUAL BAND SIGNALS FROM AN ORBITAL LOCATION USING AN OUTDOOR UNIT WITH A SUBREFLECTOR AND ADDITIONAL ANTENNA FEED

FIELD

The present disclosure relates generally to a satellite signal receiving outdoor unit, and more particularly, to an outdoor unit having multiple feeds for receiving various frequency bands.

BACKGROUND

The statements in this section merely provide background information related to the present disclosure and may not constitute prior art.

Satellite data and television systems use an outdoor unit that includes a reflector that directs satellite signals to a feed. The reflector is typically aligned at a particular satellite so that the signals from the satellite are concentrated at the feed. This allows the feed to receive a strong signal. Satellites typically generate one frequency and the feed is tuned for that particular frequency.

Some satellite systems include satellites that are capable of transmitting more than one frequency. That is, a satellite may be provided with more than one transponder that is capable of generating signals at another frequency than another transponder on the same satellite. The second frequency signals are thus not utilized.

Satellite television providers try to increase the amount of services they provide. Additional satellites are expensive and, thus, maximizing the amount of services from existing satellites is an important goal.

Therefore, it is desirable to utilize signals at a different frequency than a primary frequency in a satellite system.

SUMMARY

In one aspect of the disclosure, a system includes a first satellite at a first orbital slot having a first transponder generating a first downlink signal at a first frequency and a second downlink signal at a second frequency. The system also includes an outdoor unit directed at the first satellite that includes a support structure, a reflector coupled to the support structure and reflecting the first downlink signal and the second downlink signal, a first feed coupled to the support structure receiving the first downlink signal and a second feed coupled to the support structure receiving the second downlink signal. A second reflector reflects the second downlink signal to the second feed.

In a further aspect of the disclosure, an outdoor unit includes a support structure, a reflector coupled to the support structure reflecting a first downlink signal from a first satellite and a second downlink signal from a second satellite and a first feed coupled to the support structure receiving the first downlink signal. A second feed is coupled to the support structure and receives the second downlink signal that is reflected from a secondary reflector.

In a further aspect of the disclosure an outdoor unit includes a support structure, a first reflector coupled to the support structure and reflecting a first downlink signal from a first satellite along an axis. The first reflector reflects the second downlink signal from the first satellite along the axis. A first feed is coupled to the support structure along the axis and receives the first downlink signal. A second reflector is coupled to the support structure not along the axis and reflects spillover from the second downlink signal. A second feed is coupled to the support structure and receives spillover from the second downlink signal.

In yet another aspect of the disclosure, a method of connecting an outdoor unit having a support structure, first reflector coupled to the support structure reflecting a first downlink signal to a first feed includes coupling a second feed to the support structure, coupling a second reflector to a support structure to reflect spillover from the second satellite signal feed to the second feed.

One advantage of the disclosure is that the system may be implemented in a bolt-on configuration. That is, existing outdoor units having a feed support structure and primary reflector may be retrofitted with a secondary reflector and a secondary feed to receive signals from the secondary reflector. The system may also be implemented in a factory-ready implementation already including the secondary reflector and the secondary feed.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
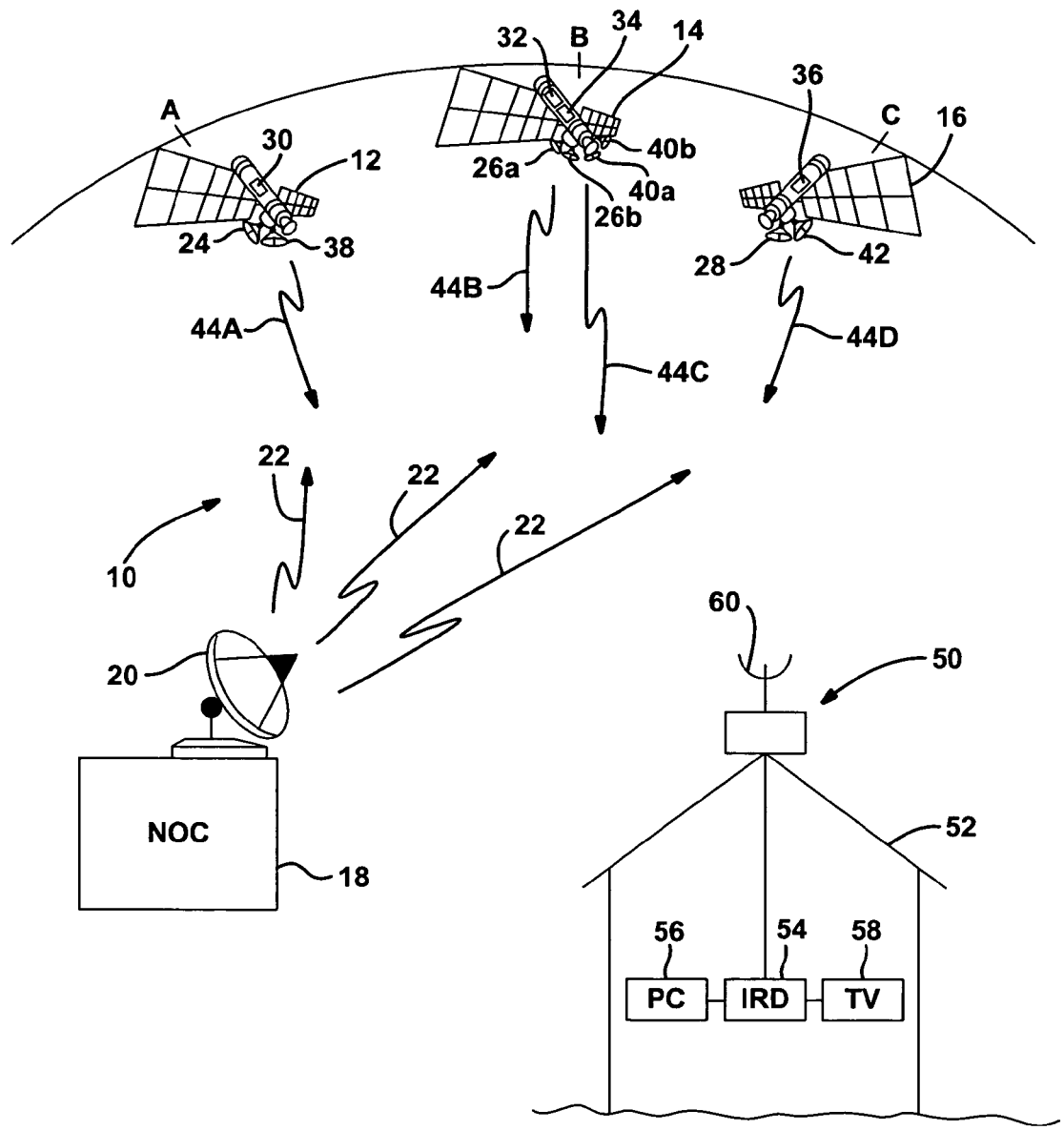
FIG. 1 is a system view of a satellite transmission system formed according to the present disclosure.

The following description is merely exemplary in nature and is not intended to limit the present disclosure, application, or uses. It should be understood that throughout the drawings, corresponding reference numerals indicate like or corresponding parts and features. The present disclosure is described with respect to a satellite television system. However, the present disclosure may be used for various uses including satellite transmission and data transmission and reception for home or business uses.

Referring now to FIG. 1, a satellite system 10 according to the present disclosure includes satellites 12, 14 and 16 that receive uplink signals from a network operation center 18. The network operation center includes a transmitting antenna 20 that may be implemented as a plurality of transmitting antennas. The transmitting antenna 20 transmits uplink signals 22 to respective receiving antennas 24, 26 and 28 on satellites 12, 14 and 16. Satellite 14 may also include two satellite antennas 26A and 26B, although one receiving antenna may be provided. Satellite 12 includes a transponder 30. Satellite 14 includes two transponders 30 and 34. Satellite 16 includes a transponder 36. Satellite 12 may also include a transmitting antenna 38. Satellite 14 may include one or two transmitting antennas 40A and 40B. Satellite 16 includes a transmitting antenna 42. The transmitting antennas 38, 40A, 40B and 42 generate downlink signals 44A, 44B, 44C and 44D. As will be further described below, transponders 32 and 34 may generate downlink signals 44B and 44C having different downlink frequencies. For example, downlink signal 44B may be at the Ku band. Downlink signals 44A, 44C and 44D may be at the Ka band.

The satellites 12, 14 and 16 may be positioned at various orbital spots A, B and C. In one configuration, orbital spots A, B and C comprise orbital spots 99° West, 101° West and 103° West, respectively. The orbital spacings are consecutive geosynchronous orbital spacings. However, the orbital spacings need not be consecutive. It should be noted that the government requires a two degree spacing between orbital slots in the geosynchronous plane. The present satellites 12, 14 and 16 are geosynchronous satellites.

An outdoor unit 50 coupled to a building 52 such as a home, multi-dwelling unit or business, receives the satellite downlink signals 44 and provides the signals to a processing circuit such as an integrated receiver decoder 54. Data signals may be used by the computer 56 and television signals may be used by the television 58. The outdoor unit 50 includes a receiving antenna structure 60.

Figure 2:
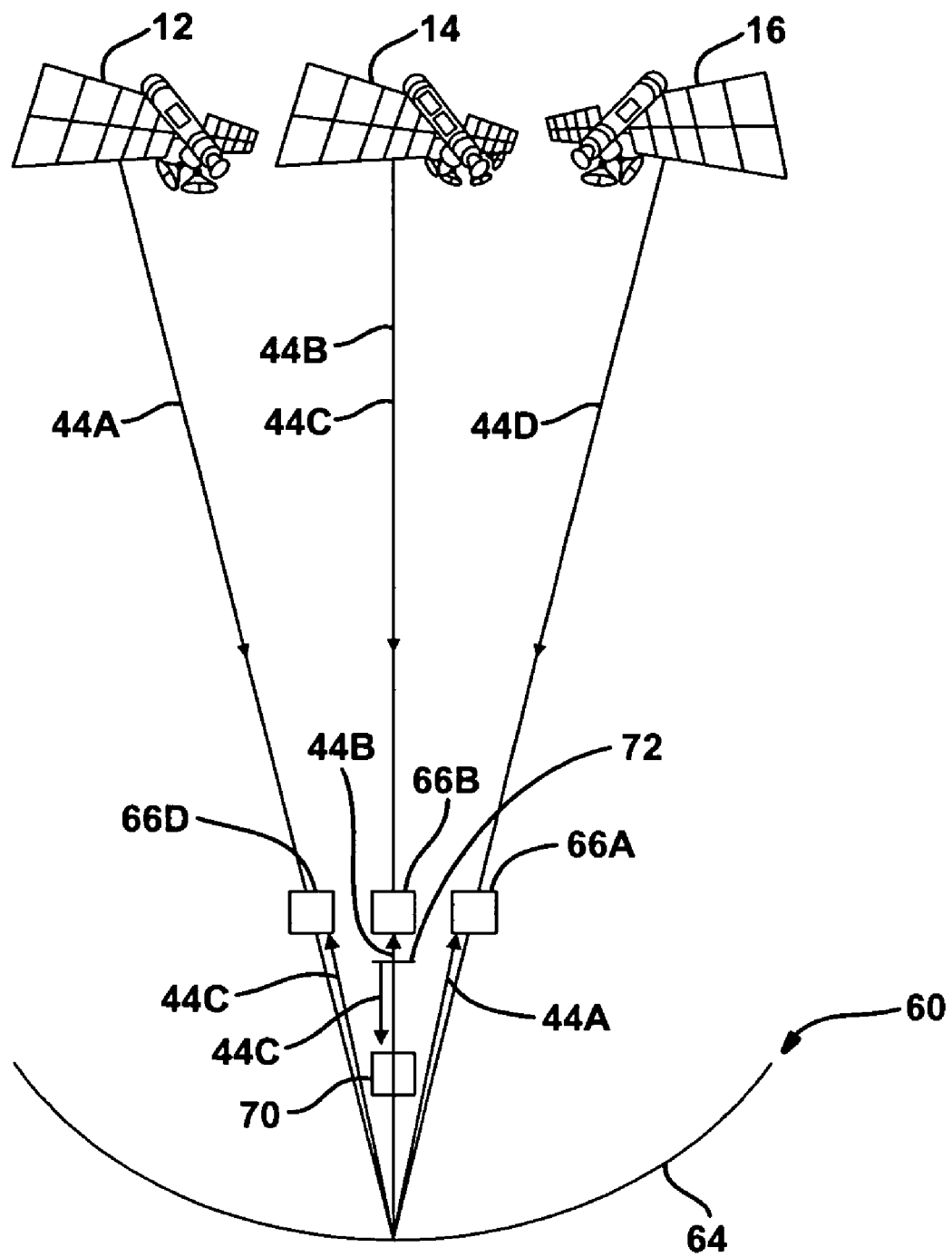
FIG. 2 is a diagrammatic view of the system and the associated axis.

Referring now to FIG. 2, a simplified diagram of a top view of the downlink signals 44A, 44B and 44C relative to the satellites 12, 14 and 16 and the receiving antenna structure 60. The primary axis of the reflector 64 is along the downlink direction 44B so that downlink signals 44B reflect from the antenna structure and are reflected to feed 66B. Downlink signals 44A reflect to feed 66A and downlink 64D reflect to feed 66D. As is illustrated, the feeds are slightly spaced apart and receive the particular satellite signal. As will be further described below, an additional feed 70 is positioned to receive downlink signals at the second frequency 44C. A secondary reflector 72 is used to reflect the downlink signals 44C.

It should be noted that various embodiments of the second reflector will be described below.

Figure 3:
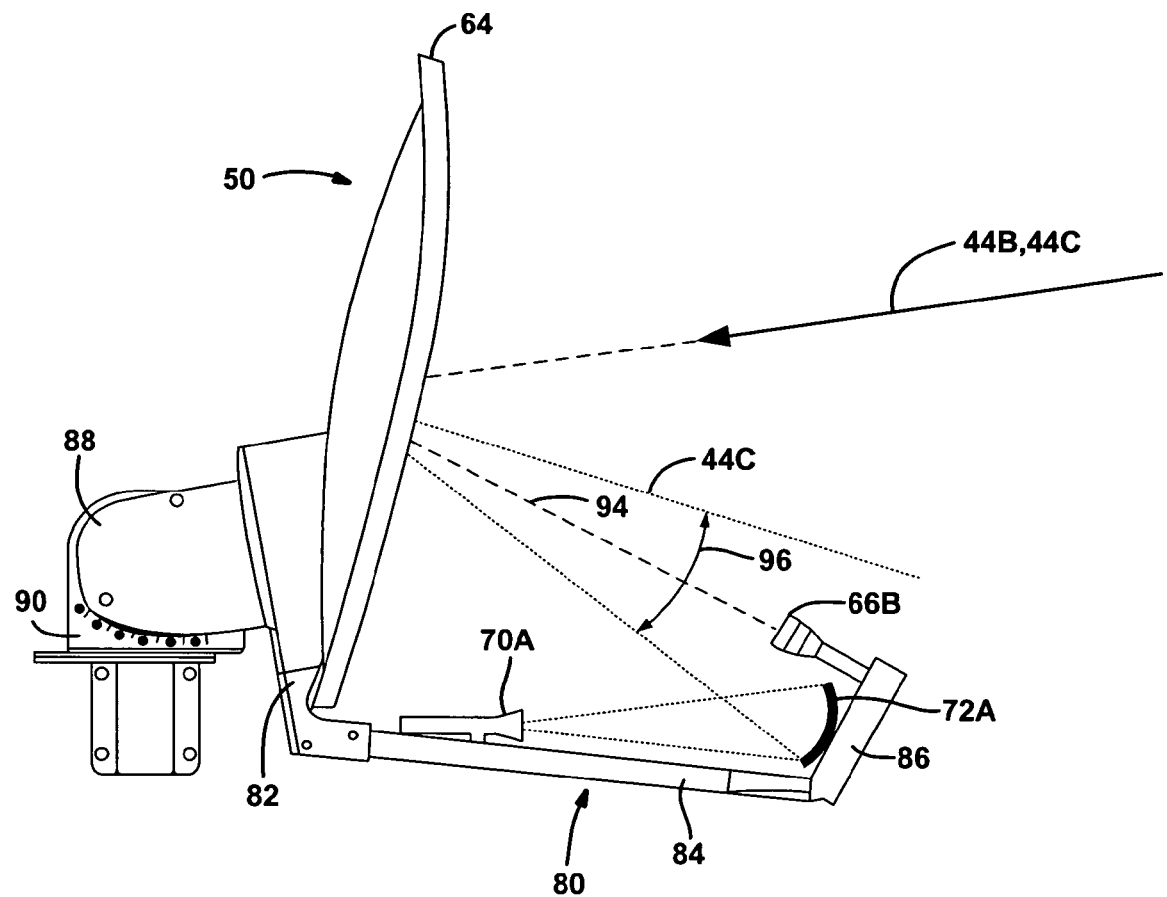
FIG. 3 is a side view of a first embodiment of an outdoor unit.

Referring now to FIG. 3, a first embodiment of an outdoor unit 50 is illustrated. As mentioned above, the outdoor unit includes a primary reflector 64 and feeds 66A, 66B and 66D. In this figure, only reflector 66B is illustrated. Feeds 66A and 66D adjacent thereto may also be present in an embodiment.

The reflector 64 and the feed 66B are coupled to support structure 80. Support structure 80 may be configured in various ways to support the reflector and the feeds. In this embodiment, the support structure 80 includes a reflector support 82, an extension portion 84 and a feed support 86. The reflector support 82 may be coupled to an elevation adjustment mechanism 88 and an azimuth adjustment mechanism 90 to allow for pointing of the reflector 64 and locking the reflector 64 in a desired position or orientation.

As was mentioned above, the arrow 44B, 44C represents the downlink signals from the satellite 14. Because the signals originate from the same orbital spot and the same satellite, they share a primary axis 94. The primary axis 94 is aligned toward the feed 66B. That is, both signals having both frequencies are aligned at feed 66B. When the signals reflect from the reflector 64, both signals do not focus completely. The signal 44C is shown having spillover area 96 that is not captured by the feed. The secondary reflector 72A is positioned to receive some spillover signal and reflects the spillover signal to feed 70A. In the drawings, the secondary reflector 72A is illustrated as a concave reflector positioned between the primary feed 66B and the support structure 80. The secondary reflector 72A may be coupled to the feed support 86 or the extension portion 84. The shape may be parabolic so that the signal is directed and concentrated to the additional feed 70A. The additional feed 70A may also be coupled to the support structure 80 and, more specifically, to the extension portion 84 of the support structure 80. The shape may also be various shapes including hyperbolic and irregular shapes so long as energy from the downlink signal 44 is directed to the feed 70A.

As will be described further below, the additional feed 70A and secondary reflector 72A may be added in the field and bolted on by service technicians so that customers desiring the content on this second frequency from the same satellite may obtain those signals without having to install a new outdoor unit.

Figure 4:
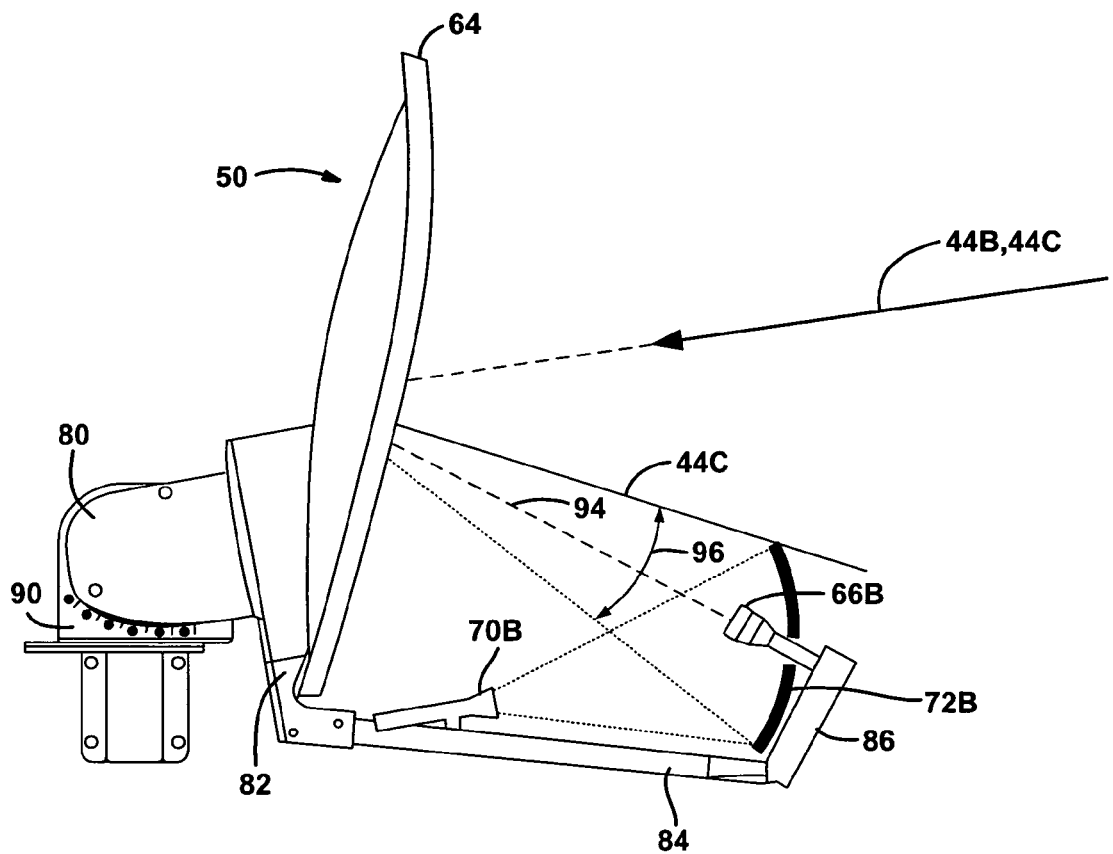
FIG. 4 is a side view of a second embodiment of an outdoor unit.

Referring now to FIG. 4, a second embodiment of the disclosure is illustrated. In this embodiment, an additional feed 70B is coupled to the support structure 80 to receive signals from the spillover 96 reflected from an additional reflector 72B. In this example, the reflector 72B is positioned around the primary feed 66B. The secondary reflector 72B reflects signals so that they are directed toward or focused upon the additional feed 70B.

The additional feed 70B may be coupled to the extension portion 84. The secondary reflector 72B may be coupled to the extension portion 84, the feed support 86 or directly to the feed 66.

Figure 5:
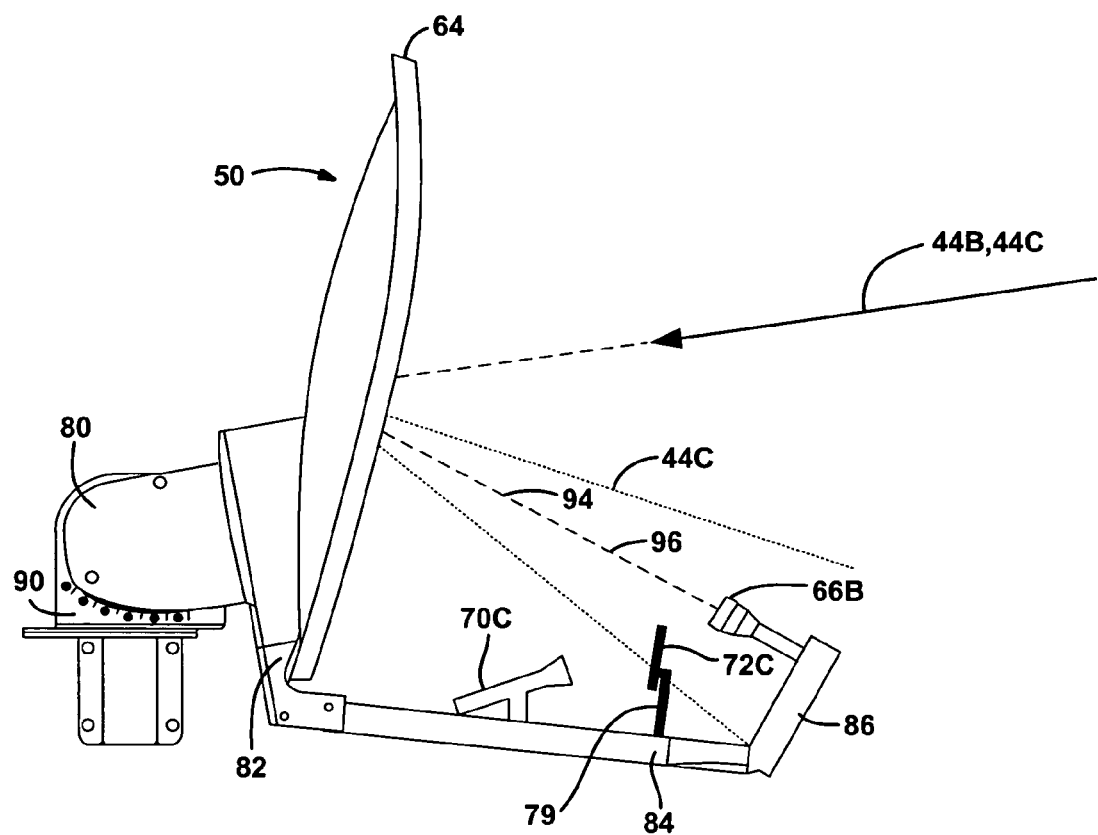
FIG. 5 is a side view of a third embodiment of an outdoor unit.

Referring now to FIG. 5, a third embodiment of the disclosure is presented in which additional feed 70C is coupled to the support structure 80 at extension arm 84. In this embodiment, the secondary reflector 72C is a concave reflector that is positioned to extend into the spillover area 96 so that a portion of the signals are focused or reflected on feed 70C. The convex shape may be a reverse parabolic or hyperbolic shape. Various other shapes may be used so long as they direct the second frequency signal to the feed 70C.

Figure 6:
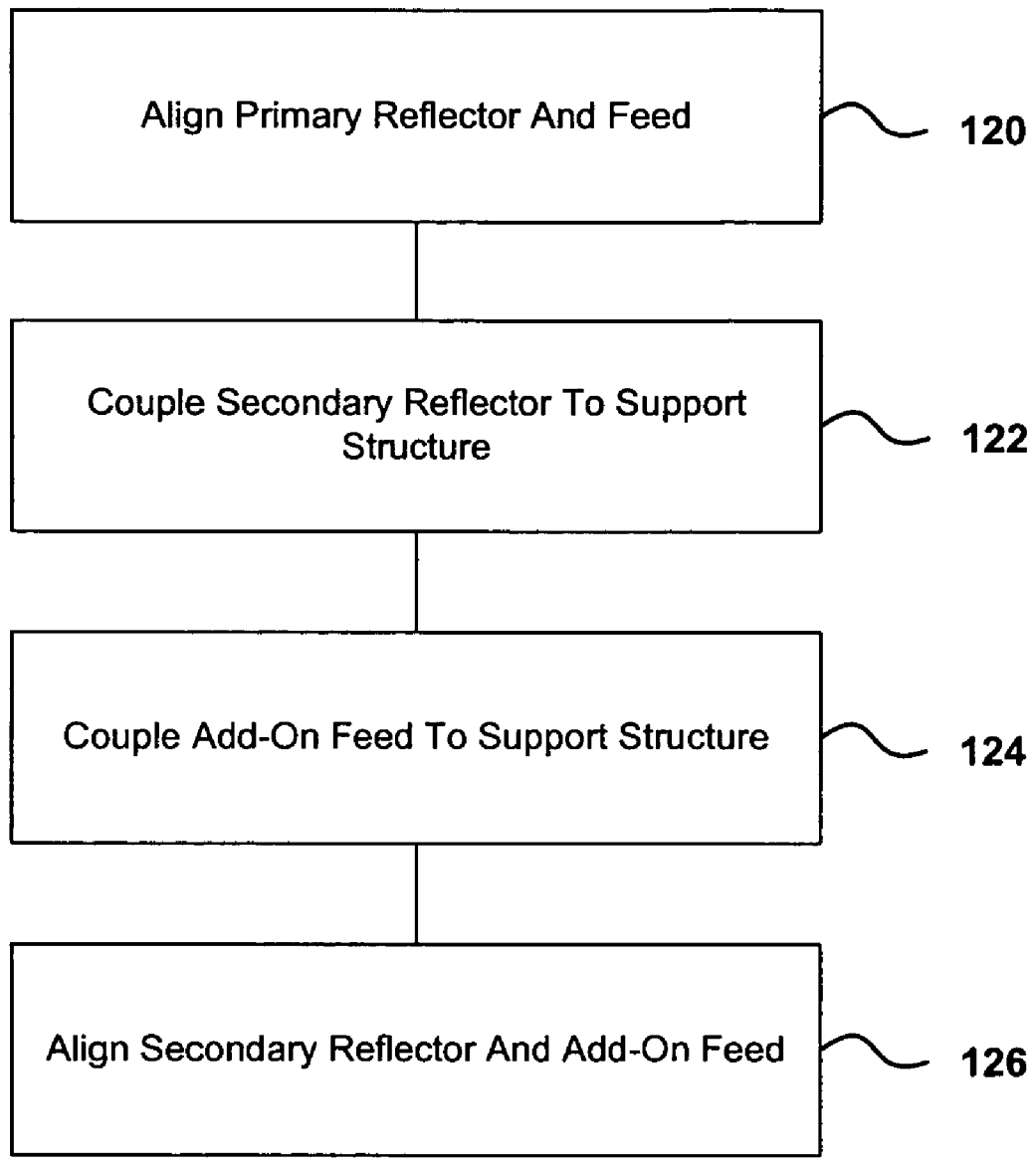
FIG. 6 is a flowchart of a method of configuring an outdoor unit according to the present disclosure.

Referring now to FIG. 6, a method of receiving a second satellite frequency signal from the same satellite is set forth. In step 120, the primary reflector and feed are aligned with the primary axis of the primary signal from the satellite. Carrying forward with the example above, the primary signal is signal 44B and from the satellite 14.

In step 122, a secondary reflector is coupled to the support structure. In step 124, an add-on feed is also coupled to the support structure. In step 126, the secondary reflector and the add-on feed are aligned so that a maximum signal strength may be obtained.

As can be seen by the above, the present system may be used in addition to presently deployed outdoor units. The present disclosure allows the presently deployed systems to receive a second frequency band from the same satellite as one in which another frequency band is broadcast. The present system may be used for receiving various types of signals including television signals on both the primary and secondary frequency bands or television and data signals or merely data signals on both frequency bands.

What is claimed is:

1. A system comprising:
 a first satellite at a first orbital slot having a first transponder generating a first downlink signal at a first frequency and a second downlink signal at a second frequency;
 an outdoor unit comprising,
 a support structure;
 a reflector coupled to the support structure and reflecting the first downlink signal and the second downlink signal;
 a first feed coupled to the support structure receiving the first downlink signal;
 a second feed coupled to support structure receiving the second downlink signal; and a secondary reflector reflecting the second downlink signal to the second feed.

2. A system as recited in claim 1 wherein the first downlink signal comprises a video signal.

3. A system as recited in claim 1 wherein the second downlink signal comprises a video signal.

4. A system as recited in claim 1 wherein the first downlink signal and the second downlink signal comprises a digital video signal.

5. A system as recited in claim 1 wherein the first downlink signal or second downlink signal comprises a high-definition digital video signal.

6. A system as recited in claim 1 wherein the first downlink signal comprises a digital video signal and the second downlink signal comprises a high-definition digital video signal.

7. A system as recited in claim 1 further comprising a second satellite at a second orbital slot having a third transponder generating a third downlink signal, said reflector reflecting the third downlink signal and wherein the outdoor unit comprises a third feed coupled to the support structure for receiving the third downlink signal.

8. A system as recited in claim 7 wherein the third downlink signal comprises a Ka band signal.

9. A system as recited in claim 7 further comprising a third satellite at a third orbital slot having a fourth transponder generating a fourth downlink signal, said reflector reflecting the fourth downlink signal and wherein the outdoor unit comprises a fourth feed coupled to the support structure for receiving the fourth downlink signal.

10. A system as recited in claim 9 wherein the fourth downlink signal comprises a Ka band signal.

11. A system as recited in claim 1 wherein the first downlink signal comprises a Ku band signal and the second downlink signal comprises a Ka band signal.

12. A system as recited in claim 1 wherein the support structure comprises a reflector support, an extension and a feed support, said second feed coupled to said extension portion.

13. A system as recited in claim 1 wherein the secondary reflector is coupled to the feed support.

14. A system as recited in claim 1 wherein the secondary reflector is coupled to the extension portion.

15. A system as recited in claim 1 wherein the secondary reflector is concave.

16. A system as recited in claim 1 wherein the secondary reflector is convex.

17. A system as recited in claim 1 wherein the secondary reflector is coupled around the first feed.

18. A system as recited in claim 1 wherein the first downlink signal comprises a Ku band signal and the second downlink signal comprises a Ka band signal.

19. A system as recited in claim 1 wherein the support structure comprises a reflector support, an extension and a feed support, said second feed coupled to said extension portion.

20. A system as recited in claim 1 wherein the secondary reflector is coupled to the feed support.

21. A system as recited in claim 1 wherein the secondary reflector is coupled to the extension portion.

22. A system as recited in claim 1 wherein the secondary reflector is concave.

23. A system as recited in claim 1 wherein the secondary reflector is convex.

24. A system as recited in claim 1 wherein the secondary reflector is coupled around the first feed.

25. A system as recited in claim 1 wherein the first downlink signal comprises a Ku band signal and the second downlink signal comprises a Ka band signal.

26. A system as recited in claim 1 wherein the support structure comprises a reflector support, an extension and a feed support, said second feed coupled to said extension portion.

27. A system as recited in claim 1 wherein the secondary reflector is coupled to the feed support.

28. A system as recited in claim 1 wherein the secondary reflector is coupled to the extension portion.

29. A system as recited in claim 1 wherein the secondary reflector is concave.

30. A system as recited in claim 1 wherein the secondary reflector is convex.

31. A system as recited in claim 1 wherein the secondary reflector is coupled around the first feed.

32. A method as recited in claim 1 wherein the first downlink signal comprises a Ku band signal and the second downlink signal comprises a Ka band signal.

33. A method as recited in claim 1 wherein coupling a second reflector comprises coupling a convex reflector.

34. A method as recited in claim 1 wherein coupling a second reflector comprises coupling a concave reflector.

35. A method as recited in claim 1 wherein coupling a second reflector comprises coupling a concave reflects about the first feed.

36. An outdoor unit comprising:
a support structure;
a reflector coupled to the support structure and reflecting a first downlink signal from a first satellite and a second downlink signal from the first satellite;
a first feed coupled to the support structure receiving the first downlink signal;
a second feed coupled to support structure receiving the second downlink signal; and
a secondary reflector reflecting the second downlink signal to the second feed.

37. An outdoor unit comprising:
a support structure;
a first reflector coupled to the support structure and reflecting a first downlink signal from a first satellite along an axis, said first reflector reflecting a second downlink signal from the first satellite along the axis;
a first feed coupled to the support structure along the axis receiving the first downlink signal;
a second reflector coupled to the support structure not along the axis reflecting spillover from the second downlink signal; and
a second feed coupled to support structure receiving spillover from the second downlink signal.

38. A method of connecting an outdoor unit having a support structure, a first reflector coupled to the support structure reflecting a first downlink signal to a first feed comprising:
coupling a second feed to the support structure; and
coupling a second reflector to the support structure to reflect spillover from the second satellite signal feed to the second feed.

* * * * *